United States Patent [19]

Bowerman et al.

[11] 4,241,027

[45] Dec. 23, 1980

[54] REDUCTIVE STRIPPING PROCESS FOR THE RECOVERY OF EITHER OR BOTH URANIUM AND VANADIUM

[75] Inventors: Paul D. Bowerman, Edmond, Okla.; Michael F. Lucid, Houston, Tex.

[73] Assignee: Kerr-McGee Corporation, Oklahoma City, Okla.

[21] Appl. No.: 961,194

[22] Filed: Nov. 16, 1978

[51] Int. Cl.$^2$ .................. C01G 43/02; C01G 31/00
[52] U.S. Cl. .................................... 423/10; 423/8; 423/63
[58] Field of Search ..................... 423/8, 10, 63

[56] References Cited

U.S. PATENT DOCUMENTS

| | | | |
|---|---|---|---|
| 3,198,599 | 8/1965 | Lewis et al. | 423/10 |
| 3,700,415 | 10/1972 | Koerner, Jr. et al. | 423/63 |
| 3,711,591 | 1/1973 | Hurst et al. | 423/10 |
| 3,836,476 | 9/1974 | Baldwin et al. | 423/10 X |

*Primary Examiner*—Leland A. Sebastian

*Attorney, Agent, or Firm*—William G. Addison

[57] ABSTRACT

A process for the reductive stripping of an organic phase containing either or both uranium and vanadium. Said process comprising contacting said organic phase containing either or both uranium in the hexavalent state and vanadium in the pentavalent state with an aqueous solution containing a predetermined quantity of trivalent vanadium to reduce either or both the uranium and vanadium to a lower valence state which is not soluble in said organic phase. The reduced uranium and vanadium separate from the organic phase and collect in the aqueous solution from which it may be subsequently recovered. The process of this invention yields an aqueous strip solution containing fewer contaminates comprising undesirable alkali metals such as sodium and the like than other known chemical stripping processes. Further, the process limits the quantity of ferrous ions present in the system to alleviate the problem of sludge formation in subsequent treatment of the wet process acid to produce phosphate fertilizer.

9 Claims, No Drawings

REDUCTIVE STRIPPING PROCESS FOR THE RECOVERY OF EITHER OR BOTH URANIUM AND VANADIUM

BACKGROUND OF THE INVENTION

1. Field of the Invention

A process for reductively stripping an organic phase containing either or both uranium and vanadium to recover either or both the uranium and vanadium therefrom.

2. Description of the Prior Art

Phosphoric acid is generally produced commercially by one of two methods. One method is generally called the "furnace" method, and the other is generally referred to as the "wet process" method. In the wet process method of producing phosphoric acid, phosphate rock is contacted with a mineral acid such as sulfuric acid. Most phosphate rock contains metal compounds in varying amounts. In many cases, these metal compounds are dissolved from the phosphate rock and appear in the wet process acid as contaminants. Uranium and vanadium compounds are among those dissolved from the phosphate rock. A prominent method for separating and recovering either or both the uranium and vanadium compounds from the wet process acid has involved solvent extraction employing selected organics as extractants.

One such process for the separation and recovery of uranium from wet process phosphoric acid is disclosed by U.S. Pat. No. 3,711,591. The extraction of the uranium from the wet process acid is effected by contacting the wet process phosphoric acid with an organic phase comprising di-2-ethylhexyl phosphoric acid (D2EHPA) and trioctylphosphine oxide (TOPO) dissolved in an organic diluent. The extracted uranium is separated from the organic phase by contacting with a reductive strip solution comprising ferrous iron dissolved in phosphoric acid solution (wet process acid) to form a concentrated uranium-containing solution. The process then calls for the reoxidation of the uranium to the hexavalent state and reextraction in a second extraction cycle with the same extractant. The higher concentration of uranium in the wet process phosphoric acid solution enables a more efficient extraction with the organic phase. The uranium-loaded organic phase then is stripped with a carbonate solution to form a uranium precipitate that is recovered.

The addition of iron to the wet process phosphoric acid to form the ferrous iron-containing stripping solution presents several problems. First, iron addition to the wet process acid causes sludge formation during the subsequent processing of the wet process phosphoric acid to form phosphate fertilizer. Second, the iron addition may cause iron phosphate solids to form within the solvent extraction apparatus. Both of these problems result in phosphate loss and hence lower fertilizer yield. A third disadvantage is the limited solubility of iron in the wet process phosphoric acid. The reducing power of the iron-phosphoric acid solution is more effective as the ferrous iron concentration is increased. Unfortunately, as the ferrous iron concentration is increased, the amount of iron phosphate precipitate increases and may contaminate the solvent extraction process.

One process for the separation and recovery of vanadium from wet process phosphoric acid is disclosed by U.S. Pat. No. 3,700,415, which uses an organic extractant comprising a neutral organophosphorus complexing agent in a water-immiscible organic diluent. The organic phase is introduced into a mixer-settler wherein it is subjected to washing to remove co-extracted phosphoric acid to reduce the quantity of alkaline stripping agent required to strip the vanadium from the organic phase. Alternatively, inorganic salt solutions are used to scrub the organic phase. The scrubbed organic then is stripped by contacting with an alkaline stripping agent.

One process for the simultaneous separation and recovery of uranium and vanadium is disclosed by U.S. Pat. No. 3,836,476, assigned to the same assignee as the present invention. That process comprises contacting the wet process acid with an organic extractant comprising a dialkyl phosphoric acid, a trialkylphosphine oxide compound and an organic diluent whereby the uranium and vanadium are coextracted into the organic phase. The loaded organic phase is separated from the wet process phosphoric acid and the uranium and vanadium are stripped therefrom with an aqueous base or other alkaline stripping agent such as ammonium hydroxide or sodium carbonate.

It would be desirable to provide a reductive stripping process whereby the recovered uranium and vanadium is not contaminated by undesirable alkali metal ions and is recovered in a concentrated form with the use of a minimum of reductant.

SUMMARY OF THE INVENTION

The discovery now has been made that trivalent vanadium in a phosphoric acid solution comprises a stripping medium for recovering either or both uranium and vanadium from organic extractants containing either or both hexavalent uranium and pentavalent vanadium.

When uranium is extracted from wet process phosphoric acid by the process described in, for example, U.S. Pat. No. 3,711,591, the uranium loaded organic phase contains hexavalent uranium. To recover the uranium specie from the loaded organic phase, the organic phase is contacted with an aqueous stripping solution comprising a phosphoric acid solution containing trivalent vanadium. The trivalent vanadium reduces the hexavalent uranium to the quadrivalent state and effectively transfers the uranium to the aqueous stripping solution. This process strips the uranium from the organic phase without the formation of undesirable by-products such as iron phosphate solids and without a reduction in the yield of phosphate for fertilizer production.

When vanadium is extracted from wet process phosphoric acid by the process described in, for example, U.S. Pat. No. 3,700,415 the vanadium loaded organic phase contains pentavalent vanadium. To recover the pentavalent vanadium specie from the loaded organic phase the organic phase is contacted with a stripping solution comprising a phosphoric acid solution containing trivalent vanadium. The trivalent vanadium reduces the pentavalent vanadium to the quadrivalent state and effectively transfers the vanadium to the aqueous stripping solution. Employing trivalent vanadium in phosphoric acid as the stripping agent eliminates the need for scrubbing the organic phase. Further, this process avoids contamination of the vanadium product with undesirable alkali metal ions.

The reductive stripping agent of this process is capable of continuous regeneration. The regeneration is effected by withdrawing a portion of the quadrivalent vanadium product solution which then is converted into a solution containing trivalent vanadium by electrolytic or chemical reduction. After the regeneration is initiated, the solvent extraction process supplies the vanadium required for the subsequent stripping. Thus, vanadium make-up of the strip solution is necessary only upon process start up. The make-up stripping solution may be formed by direct dissolution of a di or trivalent vanadium compound or indirectly by the addition of a quadrivalent or pentavalent vanadium compound to a phosphoric acid solution which then is reduced to the trivalent state by electrolysis, hydrogen reduction, zinc amalgam reduction, or some other suitable chemical procedure such as dissolution of iron in the phosphoric acid solution and concommitant reduction of the vanadium.

During continuous operation of this process, the vanadium concentration of the stripping solution will increase to a very high concentration. Normally, the concentration may exceed 60 gm $V_2O_5$/l. In continuous processing, a sufficient quantity of the quadrivalent vanadium product solution is recycled until sufficient stripping solution is produced. Then, as further loaded organic phase is generated, the resulting trivalent vanadium solution is used to strip the vanadium from the organic phase. This results in the formation of a high grade quadrivalent vanadium-phosphoric acid solution from which the quadrivalent vanadium may be recovered by oxidation and precipitation of pentavalent vanadium products.

When uranium and vanadium are simultaneously extracted from the wet process phosphoric acid by the process described in, for example, U.S. Pat. No. 3,836,476 the uranium and vanadium exist in the loaded organic phase as hexavalent and pentavalent specie, respectively. The organic is stripped by contact with a sufficient quantity of the phosphoric acid solution containing trivalent vanadium. The uranium is recovered from the aqueous solution by means such as disclosed in U.S. Pat. No. 3,711,591. Following the uranium recovery, the vanadium can be recovered by oxidizing the aqueous solution and precipitating a pentavalent vanadium product. Further, it has been discovered that the phosphoric acid solution containing trivalent vanadium can be used to effect a fractional separation of the uranium and vanadium. The fractional separation is effected through control of the quantity of stripping solution contacted with the loaded extractant. The quantity of stripping solution mixed with the loaded organic phase is controlled to provide only that necessary to react with the pentavalent vanadium. Under this circumstance, only the pentavalent vanadium in the loaded organic phase is reduced and the hexavalent uranium remains unchanged. The organic and aqueous phases are separated and then the organic phase is contacted with additional stripping solution to reduce the uranium. Thus, in this manner, phosphoric acid product solutions can be formed which consist primarily of either vanadium or uranium concentrates.

In each of the organic solvent extraction methods described hereinabove, the new reductive stripping process of this invention also contemplates the use of trivalent vanadium and mixtures thereof with solutions containing iron ions in the di and trivalent states. Such a reductive stripping solution could result from the reduction of quadrivalent vanadium to trivalent vanadium with iron or when ferric iron is extracted by the organic phase along with the hexavalent uranium extracted from the wet process phosphoric acid. Such trace amounts of iron have no disadvantageous effect upon the process of this invention.

DESCRIPTION OF THE PREFERRED EMBODIMENT

Wet process phosphoric acid containing uranium and vanadium specie is treated by the process described in U.S. Pat. No. 3,711,591, the disclosure of which is incorporated hereby by reference, to provide a uranium loaded organic phase containing hexavalent uranium. The uranium loaded organic phase, comprising a mixture of tri-n-octylphosphine oxide and di-2-ethylhexyl phosphoric acid in an organic diluent is introduced into a multistage stripping zone. A reductive stripping solution comprising a phosphoric acid solution containing trivalent vanadium is introduced into the stripping zone to strip the uranium from the organic extractant. The phosphoric acid solution may have a concentration of from about 20 percent to about 70 percent acid as $P_2O_5$. Preferably, the phosphoric acid concentration is in the range of from about 25 percent to about 35 percent acid as $P_2O_5$. The vanadium concentration in the phosphoric acid solution, normally, is in the range of from about 10 grams to about 60 grams per liter as $V_2O_5$ and preferably is in the range of from about 10 grams to about 30 grams per liter as $V_2O_5$. The vanadium concentration may exceed 60 grams per liter as $V_2O_5$ without adverse effect to the process of this invention. Preferably, the phosphoric acid solution initially is produced by dissolving a source of di or trivalent vanadium in wet process phosphoric acid recovered from the organic extraction zone of the uranium extraction process. The phosphoric acid solution then may be recycled indefinitely in the process, subject to mechanical losses, by regenerating the reductive stripping solution in an electrolytic cell which converts quadrivalent vanadium into trivalent vanadium. The volume of strip solution utilized to strip a given volume of organic extractant may vary widely, however, an organic to aqueous ratio of from about 35 to about 100 is preferred to gain satisfactory concentration of the uranium and vanadium specie. A ratio of organic to aqueous of from about 70 to about 100 is especially preferred to concentrate uranium specie. The preferred contacting time to effect efficient stripping of the uranium loaded extractant by the reductive stripping solution is in the range of from about 5 minutes to about 10 minutes per stage.

The following example is provided to further illustrate the process of this invention and not by way of limitation.

EXAMPLE I

An organic extractant comprising 0.4 molar di-2-ethylhexyl phosphoric acid and 0.1 molar tri-n-octylphosphine oxide dissolved in kerosene is loaded with 110 mg $U_3O_8$ per liter. An aqueous strip solution is electrolytically produced from vanadyl sulfate by reduction at the cathode of an electrolytic cell. The aqueous strip solution contains 20.25 grams of trivalent vanadium per liter as $V_2O_5$ and 3.11 grams quadrivalent vanadium per liter as $V_2O_5$.

The organic extractant is separated into four samples and each sample is mixed with an equal voluem of the aqueous stripping solution after which the samples were agitated by shaking for 1, 2, 5 and 10 minutes, respectively. The aqueous stripping solution then is separated from each sample and the organic extractant is analyzed to determine the uranium content. The results of the analysis are set forth in Table I, below.

TABLE

| Sample No. | Mix Time Minutes | Organic Analysis mg $U_3O_8$/l | Strip Efficiency, % |
|---|---|---|---|
| 1 | 1 | 43 | 70 |
| 2 | 2 | 33 | 79 |
| 3 | 5 | 12 | 89 |
| 4 | 10 | <1 | >99 |

The foregoing example clearly demonstrates the efficacy of the process of the present invention in stripping hexavalent uranium from a loaded organic extractant.

The uranium concentration in the strip solution now is relatively high in comparison to the wet process phosphoric acid from which it was originally extracted. A second extraction of this solution now can be performed to form an efficiently loaded extractant from which the uranium can be recovered as a slurry of ammonium uranyl tricarbonate (AUT) by stripping with an ammonium carbonate solution.

In an alternate embodiment of this invention, wet process phosphoric acid is contacted with an organic extractant by the process described in U.S. Pat. No. 3,700,415, the disclosure of which is incorporated herein by reference, to provide a vanadium loaded organic phase containing pentavalent vanadium. The vanadium loaded organic phase comprises a neutral organophosphorous complexing agent in a water immiscible organic diluent. The vanadium loaded organic phase is introduced into a multistage extraction zone wherein it is contacted with the reductive stripping solution of the present invention to separate the pentavalent vanadium from the organic extractant. The stripping solution reduces the pentavalent vanadium to the quadrivalent form. The stripping solution is regenerated by introducing a portion of the quadrivalent vanadium containing phosphoric acid solution into an electrolytic cell. The remaining portion of the stripping solution may be subjected to additional solvent extraction to further concentrate the vanadium specie or the stripping solution can be treated with suitable chemicals to precipitate the vanadium therefrom.

The stripping solution of the present invention provides the additional benefit that the organic phase need not be scrubbed following wet process acid-organic disengagement to purify the organic to avoid the loss of valuable phosphate values through precipitation during stripping which might otherwise occur if a stripping solution containing ferrous iron was employed.

The following example is provided to further illustrate the process of this invention and not by way of limitation.

EXAMPLE II

An organic extractant comprising 0.125 molar tri-n-octylphosphine oxide dissolved in kerosene is loaded with 120 mg of pentavalent vanadium per liter as $V_2O_5$.

An aqueous strip solution is electrolytically prepared by reduction of vanadyl sulfate at the cathode of an electrolytic cell. The aqueous strip solution contains 20.25 grams of trivalent vanadium per liter as $V_2O_5$ and 3.11 grams of quadrivalent vanadium per liter as $V_2O_5$.

An equal volume of the loaded organic extractant and the stripping solution is introduced into a multistage stripping apparatus wherein the extractant and strip solution are contacted in three countercurrent stages. The temperature of the mixture is maintained at about 50 degrees C. The mix time per stage is maintained at about 5 minutes and an intra-stage recycle ratio of aqueous to organic of about 1 is maintained in each stage.

The stripping solution then is separated from the organic extractant and a portion of the extractant phase is analyzed to determine the quantity of vanadium remaining. The organic extractant is found to contain less than 1 percent of the vanadium which was originally present.

The foregoing example clearly demonstates the ability of the process of this invention to separate pentavalent vanadium from an organic extractant.

In yet another alternate embodiment of this invention, wet process phosphoric acid is contacted with an organic extractant by the process described in U.S. Pat. No. 3,836,476, the disclosure of which is incorporated herein by reference, to provide a uranium and vanadium loaded organic phase containing hexavalent uranium and pentavalent vanadium. The loaded organic phase comprises a mixture of a dialkyl phosphoric acid, trialkylphosphine oxide compound and an organic diluent.

To separate the uranium and vanadium specie from the organic extractant, the extractant is contacted with a sufficient quantity of the reductive stripping solution of the present invention to effect the reduction of the hexavalent uranium and pentavalent vanadium contained in the organic phase to their lower oxidation states. The stripped uranium and vanadium specie then can be recovered in a more concentrated form by extraction with selective organic extractants, such as those described hereinbefore.

In the event that it is desired to separate the uranium and vanadium into substantially separate fractions during stripping, the quantity of stripping solution contacted with the loaded extractant is controlled to effect only vanadium reduction. Under this circumstance, only the pentavalent vanadium is reduced and the hexavalent uranium remains unchanged. The organic and aqueous phases are separated and then the organic extractant is contacted with an additional quantity of stripping solution to reduce the uranium. Thus, in this manner, product solutions can be formed which consist primarily of either vanadium or uranium concentrates.

In each of the organic solvent extraction methods described hereinbefore, the new reductive stripping process of this invention contemplates the use of trivalent vanadium and mixtures thereof in which di and trivalent iron may be present. Such a reductive stripping solution could result from the reduction of quadrivalent vanadium with iron or when ferric iron is extracted by the organic phase along with the hexavalent uranium extracted from the wet process phosphoric acid.

Practice of the process of this invention effects either or both uranium and vanadium stripping without the addition of undesirable contaminants to the wet process phosphoric acid. Further, the ability to strip either or both the uranium and vanadium without the addition of quantities of iron to the strip solution avoids the problems associated with the precipitation of iron sludges in the extraction apparatus and consequent loss of phosphate values from the acid.

While the present invention has been described with particular regard to its applicability to three particular organic extractant processes, it is to be understood that the process of the present invention also is applicable to any other organic extractant process in which either or both hexavalent uranium and pentavalent vanadium are to be recovered from the organic extractant by stripping.

Further, while the present invention has been described with respect to that which is considered to be the preferred embodiment thereof, it is to be understood that changes or modifications can be made in the process without departing from the spirit or scope of the invention as set forth in the appended claims.

What is claimed is:

1. A process for recovering at least one specie selected from the group consisting of hexavalent uranium and pentavalent vanadium from wet process phosphoric acid comprising contacting said wet process phosphoric acid with an organic extractant dissolved in a substantially water immiscible organic diluent to separate the selected specie from the wet process phosphoric acid, disengaging the organic extractant from the wet process phosphoric acid and then contacting the organic extractant with a stripping solution to separate the extracted specie from the organic extractant for recovery, the improvement which comprises providing a stripping solution comprising a phosphoric acid solution containing trivalent vanadium in which the trivalent vanadium is used to reduce the extracted specie to a lower valence state to effect the separation from the organic extractant.

2. The process of claim 1 in which the stripping solution contains from about 10 to about 60 grams trivalent vanadium as $V_2O_5$ per liter.

3. The process of claim 1 in which the stripping solution comprises a phosphoric acid solution having a concentration of from about 20 percent to about 70 percent acid as $P_2O_5$.

4. The process of claim 1 in which the stripping solution comprises a phosphoric acid solution having a concentration of from about 25 percent to about 35 percent acid as $P_2O_5$ and containing from about 10 to about 30 grams trivalent vanadium as $V_2O_5$ per liter.

5. A process comprising:

contacting an organic extractant containing at least one specie selected from the group consisting of hexavalent uranium and pentavalent vanadium with a stripping solution comprising a phosphoric acid solution containing trivalent vanadium in which said trivalent vanadium is present in an effective amount to reduce at least a portion of the specie selected from the group consisting of hexavalent uranium and pentavalent vanadium contained in the extractant to a lower valence state to cause said reduced specie to separate from the organic extractant; and recovering the stripping solution containing the specie separated from the organic extractant.

6. The process of claim 5 in which the phosphoric acid concentration of the stripping solution is from about 20 percent to about 70 percent acid as $P_2O_5$.

7. The process of claim 5 in which the phosphoric acid concentration of the stripping solution is from about 25 percent to about 35 percent acid as $P_2O_5$.

8. The process of claim 5 in which the stripping solution contains from about 10 grams to about 60 grams of trivalent vanadium as $V_2O_5$ per liter.

9. The process of claim 5 in which the organic extraction contains hexavalent uranium and pentavalent vanadium and contacting the organic extractant with an effective amount of trivalent vanadium is defined as:

contacting the organic extractant containing hexavalent uranium and pentavalent vanadium with a first portion of a stripping solution containing trivalent vanadium in which said trivalent vanadium is present in an effective amount to reduce at least a portion of the vanadium specie contained in the organic extractant and then contacting the organic extractant with a second portion of the stripping solution in which the trivalent vanadium is present in an effective amount to reduce at least a portion of the uranium specie contained in the organic extractant.

* * * * *